United States Patent [19]

Klapper et al.

[11] Patent Number: 4,641,408
[45] Date of Patent: Feb. 10, 1987

[54] PLUGGER GUIDE FOR ALIGNING AN END PLUG AND A FUEL ROD TUBE END

[75] Inventors: Kenneth K. Klapper; David A. Boatwright, both of West Columbia, S.C.

[73] Assignee: Westinghouse Electric Corp., Pittsburgh, Pa.

[21] Appl. No.: 730,141

[22] Filed: May 3, 1985

[51] Int. Cl.[4] ............................................. B25B 27/14
[52] U.S. Cl. ................................................... 29/271
[58] Field of Search ............... 254/134.3 R, 134.3 FT, 254/; 226/196; 308/6 R, 6 B, 4 R; 384/449; 29/271, 270, 235, 234, 237

[56] References Cited

U.S. PATENT DOCUMENTS

| | | | |
|---|---|---|---|
| 2,903,307 | 9/1959 | Peters et al. | 308/6 B |
| 2,983,553 | 5/1961 | Dexter | 308/6 B |
| 3,003,830 | 10/1961 | Blazek et al. | 308/6 B |
| 3,194,611 | 7/1965 | Mahony | 308/6 B |
| 3,347,603 | 10/1967 | Ignatjev | 308/6 B |
| 4,260,119 | 4/1981 | Price | 226/196 |

Primary Examiner—Robert C. Watson

[57] ABSTRACT

An apparatus for applying an end plug to a nuclear fuel rod tube end includes a stationary base, a support carriage and a track assembly mounting the support carriage on the base for reciprocal movement relative to the base. The apparatus also includes a plugger guide supported on the carriage for movement therewith. The plugger guide has an elongated central bore with one end for receiving the end plug and an opposite end for receiving the tube end. The plugger guide contains a plurality of sets of bearings in spaced axial positions along the bore which adapts it to guide the tube end toward the end plug for application of the end plug into the tube end as the carriage is moved.

11 Claims, 13 Drawing Figures

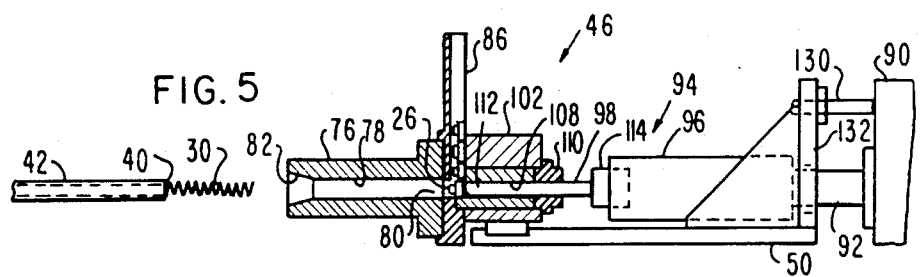
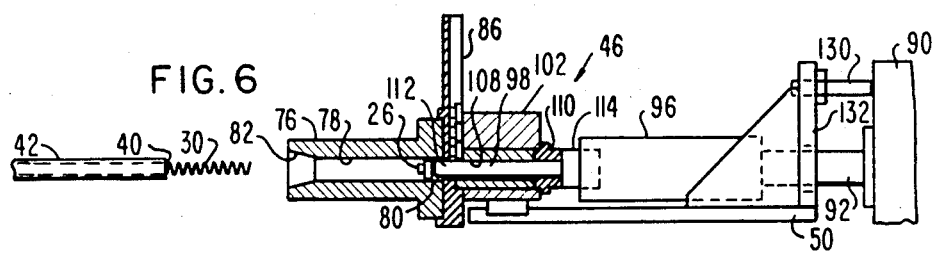
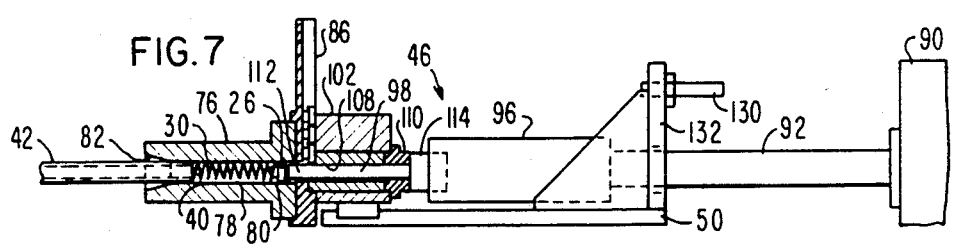
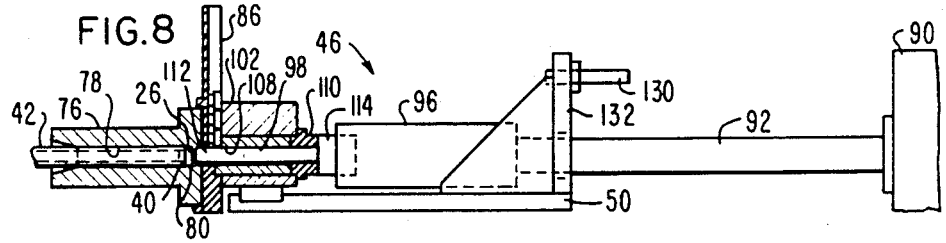
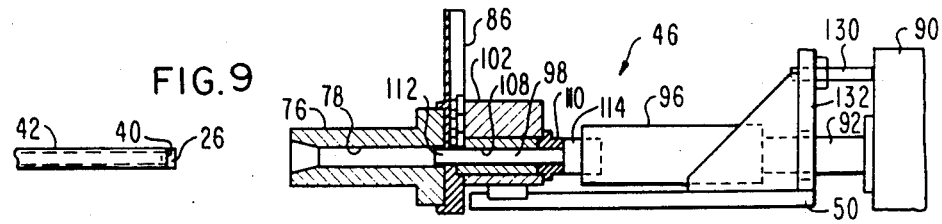
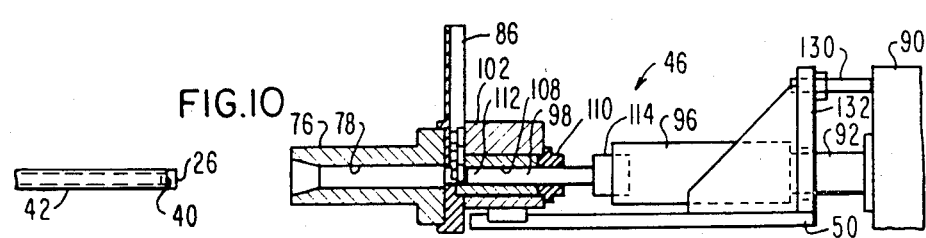

PLUGGER GUIDE FOR ALIGNING AN END PLUG AND A FUEL ROD TUBE END

CROSS REFERENCE TO RELATED APPLICATIONS

Reference is hereby made to the following copending applications dealing with related subject matter and assigned to the assignee of the present invention:

1. "Improved Apparatus For Applying An End Plug To An End Of A Fuel Rod Tube" by Mark E. Wylie et al, assigned U.S. Ser. No. 678,519 and filed Dec. 5, 1984 (W.E. 52,143).

2. "Apparatus And Method For Applying An End Plug To A Fuel Rod Tube End" by S. L. Rieben et al, assigned U.S. Ser. No. 729,398 and filed May 1, 1985 (W.E. 52,449).

BACKGROUND OF THE INVENTION

1. Field of the Invention

The present invention relates generally to the manufacture of nuclear fuel rods to be incorporated into fuel assemblies for nuclear reactors and, more particularly, is concerned with a plugger guide for aligning an end plug and an end of a fuel rod tube such that the fuel rod tube end and end plug are guided in an improved manner into engagement with one another.

2. Description of the Prior Art

Fuel elements or rods for nuclear reactors commonly encase the fissile material in thin walled cladding or tubes which serve to support the nuclear fuel during the operation of the reactor. The nuclear fuel, which is usually in the form of cylindrical pellets of enriched uranium dioxide, must be isolated from the environment surrounding the tubes to prevent contact and chemical reactions between the fuel and other materials such as water in a pressurized water reactor. Thus, the nuclear fuel is ordinarily hermetically sealed in each thin walled tube by the use of a pair of opposite end closures or plugs.

It is critical that the end plugs themselves be impermeable and mechanically strong to contain the fissile products. It is equally critical that the mechanical connection of each end plug with an end of each tube be free of defects such as discontinuities, cracks and tube distortions which could eventually produce leaks.

The act of plugging the tube is a critical operation since a heavy press fit must be used to contain the force of a plenum spring concurrently as the end plug is fitted to the tube. Press fitting an end plug into a fuel rod tube conveniently involves guiding the plug from a position at the bottom of a stack of identical plugs arrayed in a storage and feeding magazine into a guide bushing and then into a tube end. As much as 1000 pounds pressing force is required to concurrently compress the plenum spring and seat the plug in the tube end.

Present methods of applying the end plugs use close fitting guides to align the plugs with the tube, such as illustrated in FIG. 2 of the first patent application cross-referenced above. However, the guide bushing normally used must be sized somewhat larger than the maximum expected size of the end plug due to manufacturing tolerances. The necessary clearance between the plug and guide sometimes permits the plug to cock, or tip, as shown in solid line form in FIG. 2 of the first cross-referenced application, resulting in a non-square press fit which can cause shearing at the tube/plug interface, that is, a shaving action on the plug exterior as the plug is rammed home. Thereafter, when the connection is completed such as by welding the plug to the tube, faulty welds commonly result which produce leaking because of discontinuities in the weld joint or connection caused by this shaving action. Also, frequently the plug does not seat properly which increases the likelihood of leakage. Additionally, pieces of the plug are broken off occasionally as it is forced into the tube. The broken pieces not only damage the end plug but also cause foreign objects to be deposited in the fuel rod.

One set of possible solutions to the abovedescribed problems is represented by the alternative types of conforming guides described and illustrated in the first patent application cross-referenced above which have the common characteristic of holding the plug yet conforming to changes in size due to tolerance limitations. Notwithstanding the potential benefits to be gained in the use of a conforming guide, a need still exists to explore and develop improved alternative techniques for applying an end plug to the tubular end of a fuel rod which will increase the resistance of fuel rods to leakage and failure.

SUMMARY OF THE INVENTION

The present invention together with other components which comprise the invention claimed in the second application cross-referenced above, provide equipment for plugging a fuel rod tube in a manner designed to satisfy the aforementioned needs. While the present invention herein and the invention of the second cross-referenced application are particularly adapted for working together to facilitate improved insertion of end plugs into fuel rod tube ends, it is readily apparent that each invention may be incorporated either singly or together in equipment designed to achieve this purpose. However, both inventions are illustrated and described herein for facilitating a complete and thorough understanding of the present invention.

The present invention provides a plugger guide for aligning the end plug and the end of a fuel rod tube in an improved manner. The plugger guide is a substantially frictionless mechanical device utilizing a plurality of precisely positioned stainless steel ball bearings to establish the centerline of the fuel rod tube end via rolling contact therewith. The guide aligns or centers the tube end and plenum spring with the end plug before high spring force is developed. There is no sliding contact between the outside of the tube and the guide.

Accordingly, the present invention sets forth an apparatus for guiding a hollow tubular end of a nuclear fuel rod tube toward an end plug for application of the end plug into the tube end, the apparatus comprising: (a) a guide housing having an elongated central longitudinal bore with one end for receiving the end plug and an opposite end for receiving the fuel rod tube end; and (b) a plurality of sets of rolling elements disposed in the housing at axially spaced positions along and about the bore thereof, the rolling elements in each set being positioned in fixed relation with respect to one another to receive the fuel rod tube end therebetween and align the tube end with the end plug as the tube end is moved through the bore and into engagement with the end plug. Also, the fuel rod tube end guiding apparatus comprises: (c) retaining means disposed adjacent to one end of the housing bore for engaging the end plug so as to maintain it in a stationary seated position at the one end of the housing bore. The one end of the housing bore is of a diameter sized to provide a close fit with the end plug so as to hold the end plug.

More particularly, each set of rolling elements of the rod tube end guiding apparatus is preferably composed of four rolling elements per set circumferentially spaced about the housing bore approximately ninety degrees apart. The guiding apparatus is preferably composed of three sets axially spaced along the bore. Furthermore, each rolling element includes an outer cylindrical race, an inner cylindrical race inserted concentrically within and spaced radially inwardly from the outer race, and a plurality of metallic balls disposed between the outer and inner races. The plurality of rolling elements receive the fuel rod tube end therebetween and align the tube end with the end plug by establishing rolling contact between the outer races thereof and the fuel rod tube end.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIGS. 5 to 10 are schematic representations of the apparatus of FIG. 2, showing the relative positions of its components in the sequence of successive steps performed in applying the end plug to an end of the fuel rod tube.

DETAILED DESCRIPTION OF THE INVENTION

Figure 1:
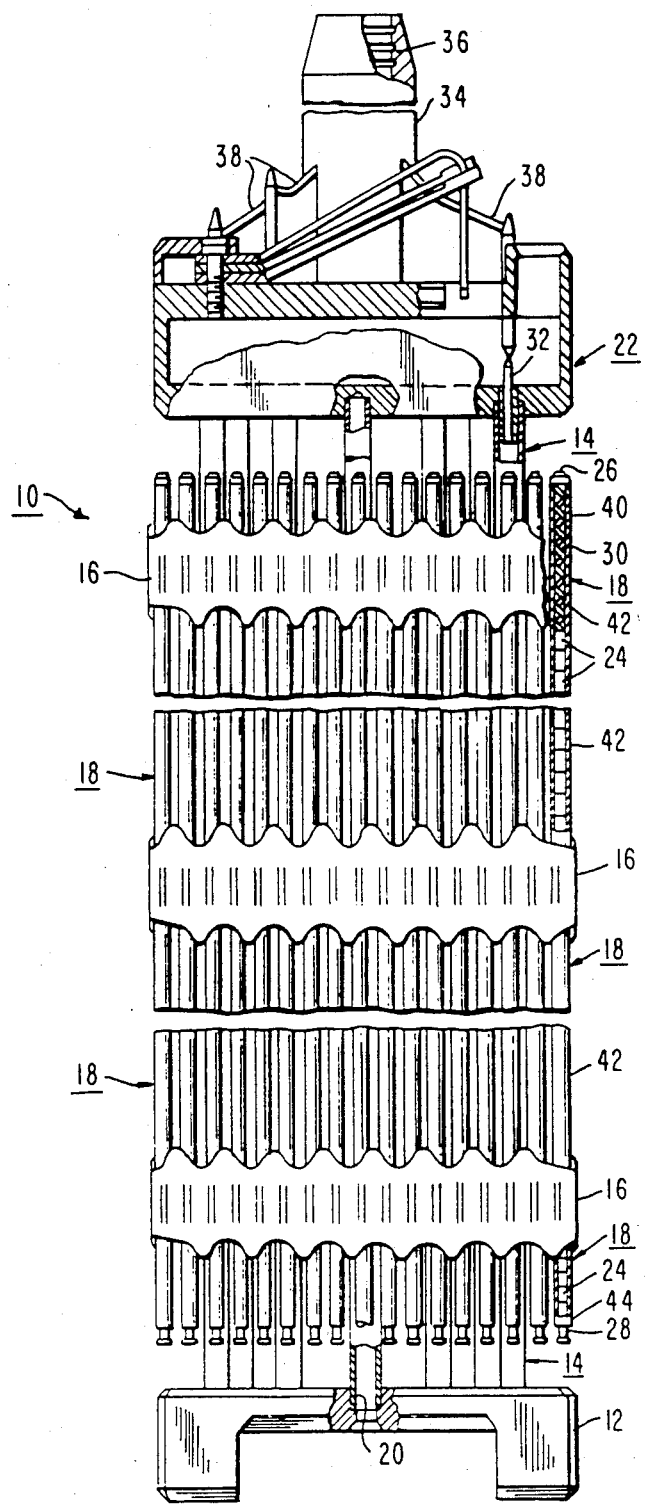
FIG. 1 is an elevational view, partly in section, of a fuel assembly having nuclear fuel rods whose end plugs were applied in accordance with the present invention, the assembly being illustrated in vertically foreshortened form with parts broken away for clarity.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24, and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the PWR. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Next, the structure and operation of the apparatus comprising the invention of the second cross-referenced application for applying the upper and lower end plugs 26,28 to the opposite ends of each fuel rod 18 will be described in relation to the application of the upper end plug 26 to the upper end 40 of an elongated tube 42 of the fuel rod 18. It should be understood that such description applies equally to the application of the lower end plug 28 to a lower end 44 of the fuel rod tube 42.

Improved End Plug Applying Apparatus

Figure 2:
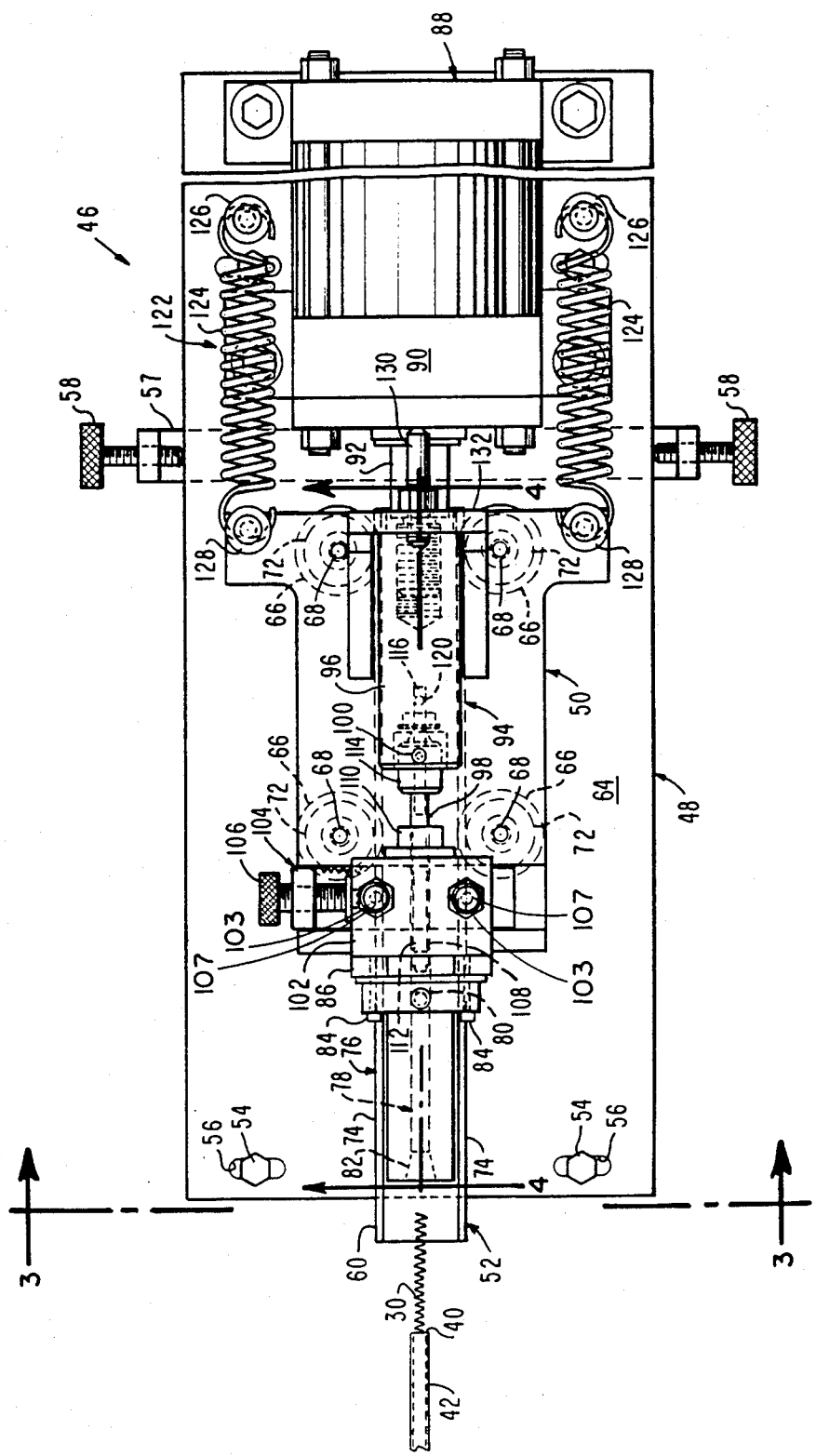
FIG. 2 is a top plan view of the apparatus for applying an end plug to a fuel rod tube end which comprises the invention claimed in the second application cross-referenced above.
Figure 3:
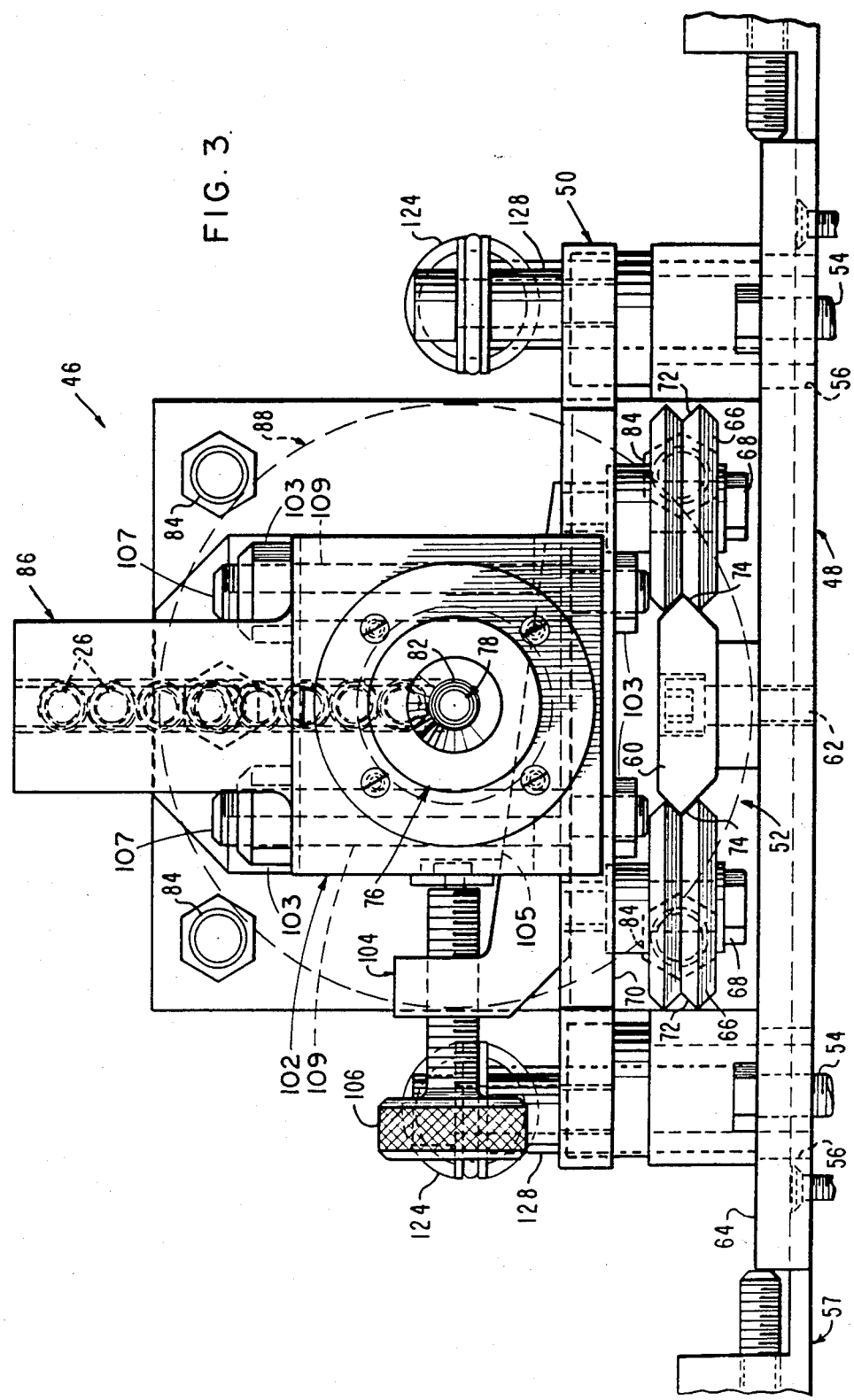
FIG. 3 is an enlarged end view of the apparatus as seen along line 3—3 of FIG. 2.
Figure 4:
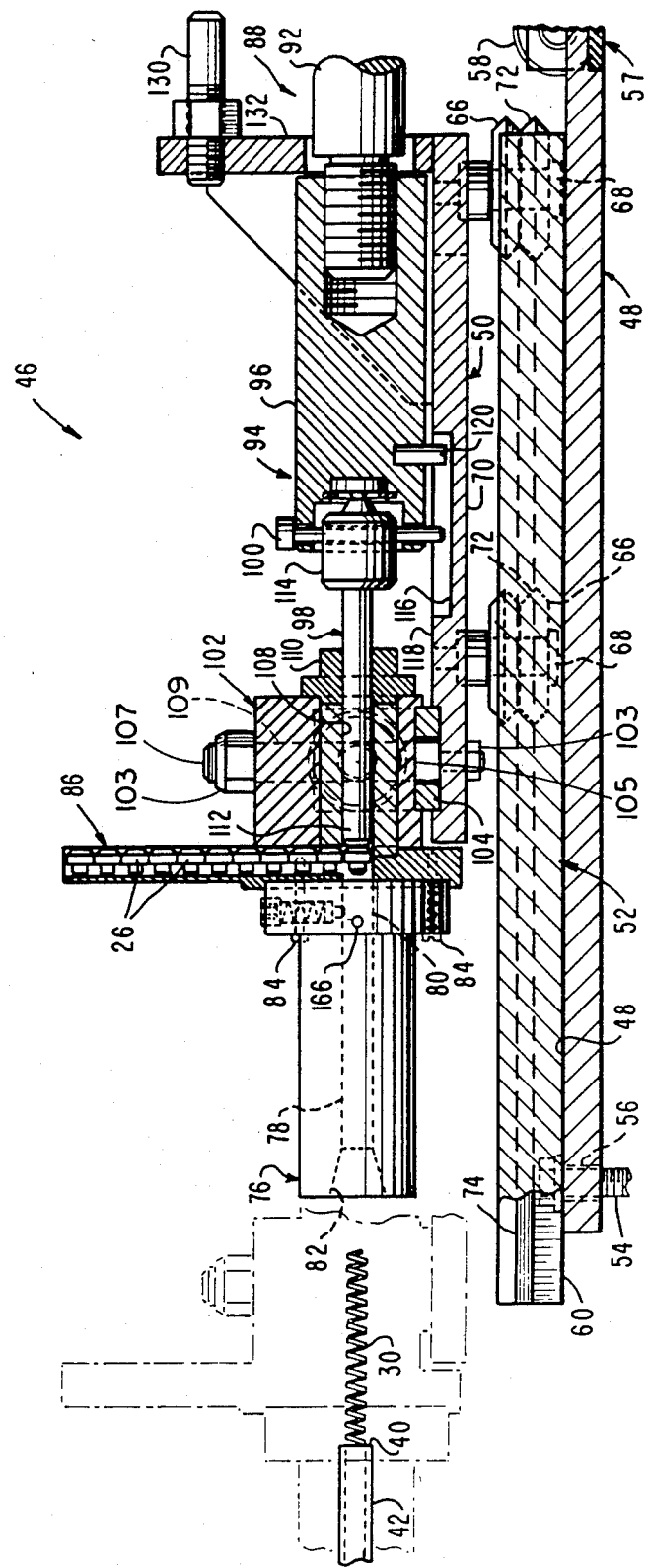
FIG. 4 is a sectional view of the apparatus taken along line 4—4 of FIG. 2.

Referring now to FIGS. 2 to 4, there is shown the preferred embodiment of the apparatus for applying the end plug 26 to the hollow upper end 40 of the nuclear fuel rod tube 42, the apparatus being generally indicated by the numeral 46 and forming the preferred embodiment of the present invention. The end plug applying apparatus 46 basically includes means for supporting a stack of the end plugs 26 in the form of a generally planar base 48, a generally planar support carriage 50 and a track assembly 52 movably mounting the support carriage on the base.

The base 48 is attached on a suitable fixture (not shown) in a stationary position by a plurality of bolts 54 which extend through elongated slots 56 formed in the front corners of the base and a lateral adjustment mechanism 57 displaced rearwardly along the base from the front thereof. The slots 56 and threaded knobs 58 of the adjustment mechanism 57 allow lateral shifting of the base 48 prior to its being fastened down to the fixture for achieving desired alignment of the base with the fuel rod tube 42.

The track assembly 52 mounts the support carriage 50 on the base 48 for reciprocal movement longitudinally of the base along a generally linear path of travel. More particularly, the track assembly 52 includes an elongated guide track 60 attached by screws 62 (only the forward one being seen in FIG. 3) upon and extending longitudinally of an upper side 64 of the base 48. Also, the track assembly 52 includes two pairs of guide rollers 66 being rotatably journalled by bolts 68 in longitudinally spaced relation on a lower side 70 of the carriage 50. The rollers 66 in each pair thereof are laterally spaced apart from one another and located on opposite sides of the guide track 60. The rollers 66 have peripheral configurations complementary to that on opposite lateral sides of the guide track 60 so as to capture the guide track therebetween and adapt the rollers for longitudinal movement therealong. Specifically, the peripheral configuration of each roller 66 is in the form of an annular circumferential groove 72, whereas the configuration on each lateral side of the guide track 60 is in the form of an outwardly projecting linear ridge 74 having a cross-sectional profile which complements and mates with that of each of the roller grooves 72.

Further, the end plug applying apparatus 46 includes guide means in the form of a plugger guide 76 being supported on the support carriage 50 for movement therewith. One embodiment of the plugger guide 76 useful in the apparatus 46 comprises the invention of the second application cross-referenced above and will be described in detail later on.

The plugger guide 76 has an elongated central bore 78 with one end 80 for receiving the end plug 26 and an opposite, flared end 82 for receiving the tubular end 40 of fuel rod tube 42. The bore 78 is adapted to guide the tube end 40 toward the end plug 26 for application of the end plug into the tube end. The plugger guide 76 is mounted by bolts 84 to the forward side of an end plug supply magazine 86 which, in turn, is mounted on the forward end of the support carriage 50. The supply magazine 86 is adapted to deliver end plugs 26, one at a time be gravity feed, into alignment with the one end 80 of the plugger guide central bore 78.

Additionally, the end plug applying apparatus 46 includes drive means, generally designated 88, coupled to the support carriage 50. The drive means 88 is actuatable to move the carriage between extreme positions respectively located remote from the end 40 of the stationarily-positioned fuel rod tube 42 (as depicted in FIG. 5) to which the end plug is to be applied and adjacent to the tube end 40 (as depicted in FIG. 8). The drive means 88 includes an actuator 90, preferably in the form of a pneumatic cylinder, stationarily disposed on the base 48 adjacent to the rear end of the support carriage 50. The actuator 90 has a drive member 92, preferably in the form of a piston rod, being movable between retracted and extended positions (as depicted respectively in FIGS. 5 and 8) along a generally linear path.

Also, the drive means 88 includes a drive force aligning and transmitting assembly 94 coupled to the drive member 92 of the actuator 90 and disposed between the end plug supply magazine 86 and the drive member. Generally speaking, the assembly 94, first, effectuates transfer of the end plug 26 to the one end 80 of the bore 78 of plugger guide 76 and, then, reciprocal movement of the support carriage 50 between its remote and adjacent positions, both taking place successively as the drive member 92 is moved between its respective retracted and extended positions, to apply the end plug 26 to the tube end 40.

The drive force aligning and transmitting assembly 94 includes a coupling element 96 threadably attached at one end to the drive member 92, an elongated plunger element 98 pivotally attached by a vertical pin 100 to an opposite end of the coupling element 96, a guideway 102 supporting the plunger element 98 for movement along the linear path of the drive member 92, and a wedge bracket 104 for mounting and vertically positioning of the guideway 102, and also the supply magazine 86, on the support carriage 50. The wedge bracket 104 has an adjustable knob 106 coupled to the guideway 102 which upon rotation of the knob will vary the position of the guideway to precisely align the plunger element 98 with the central bore 78 of the plugger guide 76. When the guide/hold-down bolt nuts 103 are loosened, rotation of knob 106 causes the wedge bracket 104 to move laterally in relation to the guideway 102. Since the inclined recess 105 provided in the bottom surface of the guideway 102 is cut at the same angle as the upper wedge surface of bracket 104, such relative lateral movement causes the guideway 102 to move vertically up and down and is constrained from any lateral motion by the close fitting relationship of the guide/hold down bolts 107 in their respective vertical bores 109 provided in the guideway 102 (see FIG. 3). When disposed in alignment with the bore 78, the plunger element 98 will transfer the end plug 26 from the supply magazine 86 to the one end 80 of the plugger guide bore 78 when the drive member 92 moves from its retracted position toward its extended position along the generally linear path.

The guideway 102 has an elongated passageway 108 through which the plunger element 98 is supported for movement along the linear path of the drive member 92 in alignment with the central bore 78 of the plugger guide 76. Also, an annular bushing 110 is mounted on the guideway 102 at one end of the passageway 108 so as to surround the plunger element 98. The plunger element 98 has a leading cylindrical end portion 112 of a reduced diametric size adapting it to fit within the passageway 108 of the guideway 102 and the central bore 78 of the plugger guide 76 for engaging and transferring the end plug 26 into the bore 78 and a trailing cylindrical end portion 114 of an enlarged diametric size adapting it to engage the bushing 110 on the guideway 102. The respective lengths of the leading and trailing end portions 112, 114 of the plunger element 98 are sized with respect to each other to ensure engagement of the bushing 110 by the plunger element trailing end portion 114 and thereby the transfer of the driving force of the drive member 92 to the support carriage 50 via the guideway 102 after transfer of the end plug 26 to the plugger guide bore 78 is completed by the plunger element leading end portion 112.

Also, the drive force aligning and transmitting assembly 94 further includes a guide slot 116 in the upper side 118 of the support carriage 50 below the coupling element 96. The slot 116 extends parallel to the linear path of movement of the drive member 92. The assembly 94 also has a guide pin 120 pressed in the underside of the coupling element 96 and extending downwardly therefrom into the guide slot 116 for restricting movement of the coupling element 96 to along the linear path as the drive member 92 moves between its retracted and extended positions.

The end plug applying apparatus 46 further includes a return device 122 interconnecting the base 48 and the support carriage 50 so as to bias the support carriage toward its remote position away from the fuel rod tube 42, as seen in FIGS. 2, 5 and 10. The return device 122 includes a pair of coil springs 124 connected to and extending between respective pairs of upstanding posts 126,128 attached on the base 48 and support carriage 50 so as to yieldably interconnect the base 48 and the support carriage 50 and extend along the base on either side of and above the track assembly 52. The springs 124 are stretched to an extended condition when the support carriage 50 is disposed at its position adjacent to the fuel rod tube end 40 and are returned to a contracted condition when the support carriage 50 is disposed at its position remote from the tube end 40. The return device springs 124 serve to bolster the transverse stability of the carriage 50 and the drive force aligning and transmitting assembly 94 as the actuator 90 drives them along their reciprocatory paths of movement.

In addition, the return device 122 includes a stop pin 130 mounted on an upright brace 132 on the rear end of the support carriage 50 at a rear side of the drive force aligning and transmitting assembly 94. The stop pin 130 is horizontally disposed to engage the actuator 90 (see FIGS. 2, 5, 9 and 10) when the support carriage 50 reaches its position remote from the fuel rod tube end 40.

Referring now also to FIGS. 5 to 10, during the initial extension of the drive member 92 (from its position in FIG. 5 to that in FIG. 6), the return springs 124 (FIG. 2) maintain the stop pin 130 engaged with the actuator 90 until the enlarged trailing portion 114 of the plunger element 98, which is interconnected to the drive member 92 via the coupling member 96, makes contact with the bushing 110 on the rear side of the guideway 102. By the time the latter event occurs, the plunger element 98 has transferred the end plug 26 from the magazine 86 to the one end 80 of the plugger guide bore 78. Further movement of the drive member 92 to its full extension guides the tube end 40 to the end plug 26 and causes application of the end plug to the tube end. It is possible to reverse the sequence and have the drive member 92 move through almost its full stroke causing the tube end 40 to be inserted into the plugger guide 76 before the plunger element 98 is moved to transfer the end plug 26 into the bore 78 and then press fitted into the tube end 40.

Then, upon retraction of the drive member 92, the return springs 124 (FIG. 2) maintain the bushing 110 on the guideway 102 in contact with the enlarged trailing end portion 114 of the plunger element 98 (as seen in FIGS. 7 to 9), whereby the leading end portion 112 of the plunger element 98 remains in the plugger guide bore 78 as the drive member 92 initially retracts. Then, when the stop pin engages the actuator 90, as seen in FIG. 9, the support carriage 50 halts but the drive element 92 and drive force transmitting assembly 94 continue until the coupling member 96 bottoms against the upright brace 132 (see FIG. 10).

Improved Plugger Guide

Figure 11:
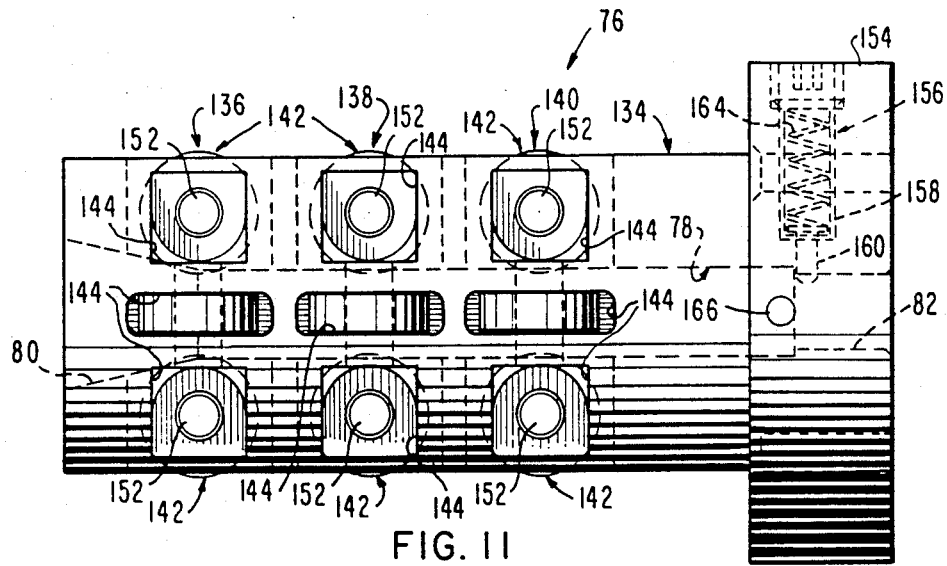
FIG. 11 is an enlarged side elevational view of the plugging guide of the present invention which can advantageously be incorporated in the apparatus of FIG. 2.
Figure 12:
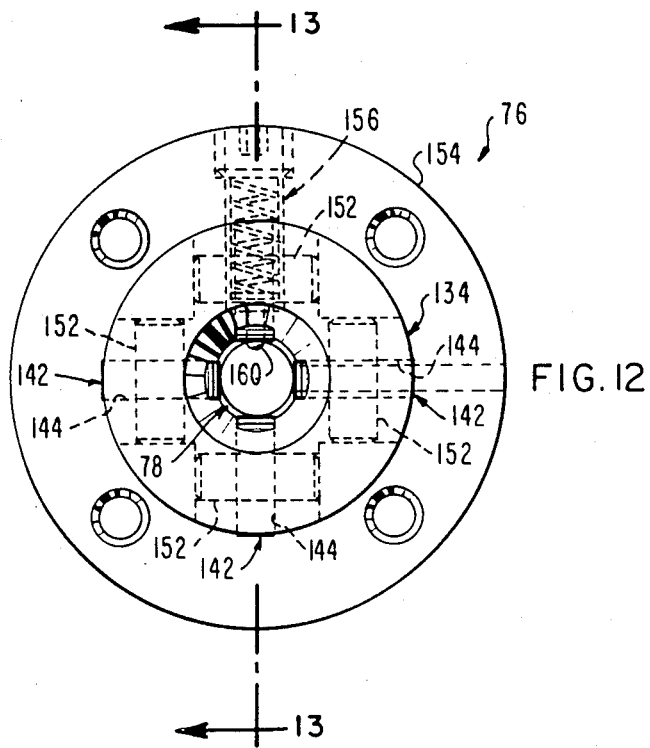
FIG. 12 is an end view of the plugging guide of FIG. 11.
Figure 13:
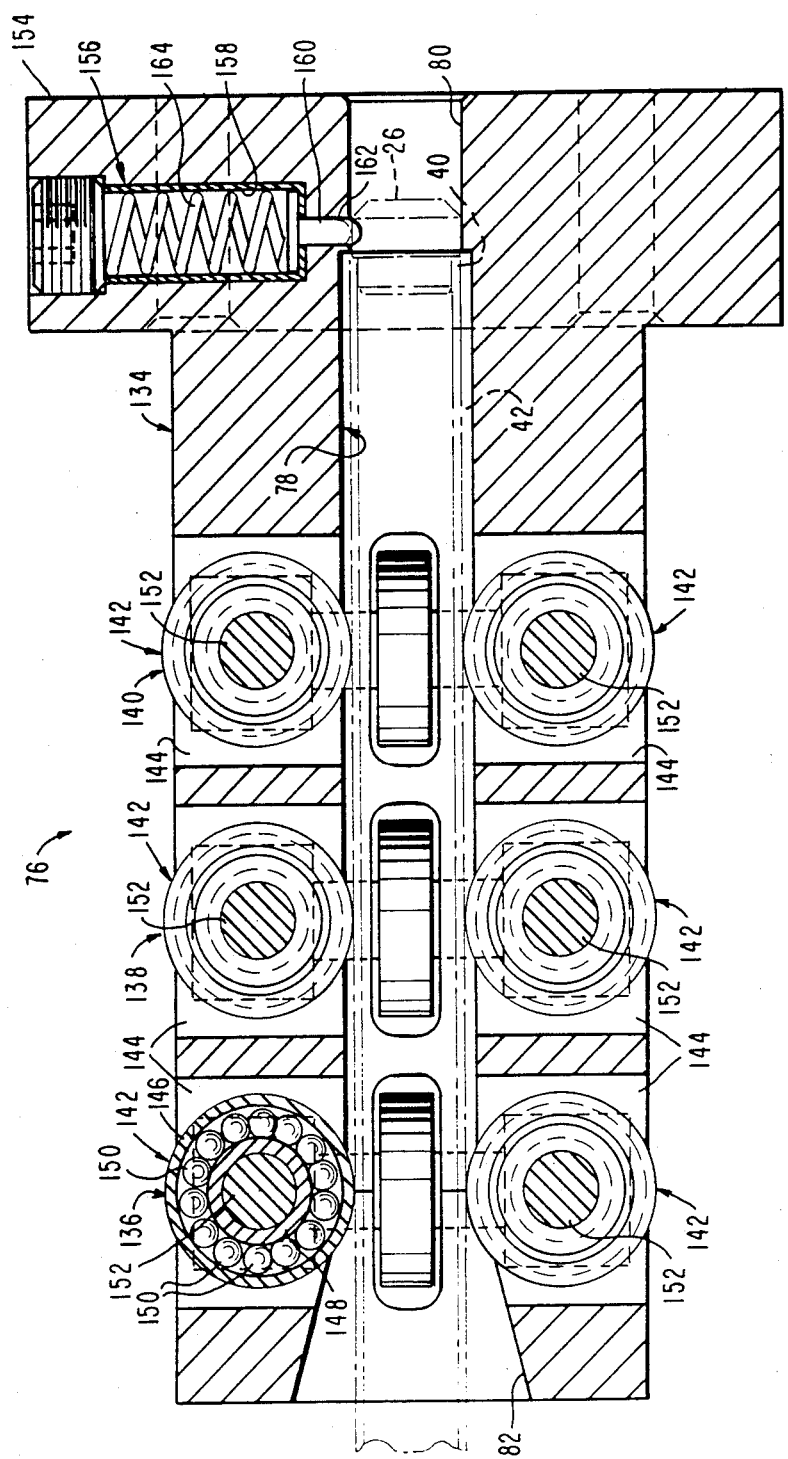
FIG. 13 is a sectional view of the plugging guide taken along line 13—13 of FIG. 12.

The plugger guide 76 can take the form of the apparatus seen in FIGS. 11 to 13 which comprises the present invention. The plugger guide 76 includes a guide housing 134 having the elongated central longitudinal bore 78 with the one end 80 for receiving the end plug 26 and the other opposite end 82 for receiving the fuel rod tube end 40 (with or without the plenum spring 30). Preferably, the one end 80 of the housing bore 78 is of a diameter less than that of the opposite end 82 and is sized to provide a close fit with the end plug 26 so as to hold the end plug 26.

Also, the plugger guide 76 includes a plurality 9 of sets 136,138,140 of rolling elements 142 disposed in the housing 134 at axially spaced positions along and about the central longitudinal bore 78 thereof. The rolling elements 142 in each set are positioned in separate recesses 144. The recesses 144 are formed in the housing 134 so as to extend radially from the central bore 78 and opening into it and also open at the exterior of the housing. The rolling elements 142 are rotatably mounted in the respective recesses 144 in a fixed relation with respect to one another with their peripheries extending into the bore 78 for establishing rolling contact with the fuel rod tube end 40 when it is inserted into the plugger guide bore 78. The rolling elements 142 are precisely positioned with respect to one another to accurately align the tube end 40 with the end plug 26 as the tube end 40 is moved through the bore 78 between the rolling elements 142 and into engagement with the end plug 26.

More particular, as best seen in FIG. 13, each rolling element 142, preferably in the form of a stainless steel ball bearing, includes a larger diameter outer cylindrical race 146, a smaller diameter inner cylindrical race 148 inserted concentrically within and spaced radially inwardly from the outer race 146 and a plurality of metallic balls 150, preferably composed of stainless steel, disposed between the outer and inner races 146,148 for allowing rotation of the outer race relative to the inner race. Each rolling element 142 is rotatably mounted in the guide housing 134 by a pin 152 which extends across one of the recesses 144 and is received in a slip fit through the inner race 148 and connected in a press fit with the portions of the housing 134 which define the one recess.

Still further, each of the sets 136,138,140 of rolling elements 142 is composed of four rolling elements per set circumferentially spaced about the guide housing bore 78 in the recesses 144 which are preferably approximately ninety degrees apart. Also, there are preferably three sets of rolling elements axially spaced along the bore 78.

Finally, at an enlarged inner end 154 of the plugger guide 76 which surrounds the one end 80 thereof, yieldable retaining means, generally designated 156, is disposed adjacent to the one end 80 of the housing bore 78 for engaging the end plug 26 so as to maintain it in a stationary seated position at housing bore end 80. More particularly, the retaining means 156 includes a recess 158 defined in the enlarged inner housing end 154 so as to extend generally perpendicular to the one end 80 of the housing bore 78. A retainer pin 160 is disposed in the recess 158 and extends therefrom through a smaller diameter opening 162 into the central bore end 80 for engagement with the periphery of the end plug 26 when received at the one bore end 80. A coil spring 164 disposed in the recess 158 outwardly of the pin 160 biases the pin toward the one end 80 of the housing bore 78 such that the pin 160 yieldably engages the end plug periphery and holds the end plug in the stationary seated position. The one end 80 of the housing bore 78 is of a diameter sized to provide a close fit with the end plug 26 so as to assist in holding the end plug. There is also an observation hole 166 in the enlarged guide housing end 154 for inspection to determine if an end plug 26 is present at its bore end 80.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. Apparatus for guiding a hollow tubular end of a nuclear fuel rod tube toward an end plug for application of said end plug into said tube end, said apparatus comprising:
    (a) a guide housing having an elongated central longitudinal bore with one end for receiving the end plug and an opposite end for receiving the fuel rod tube end;
    (b) a plurality of sets of rolling elements disposed in said housing at axially spaced positions along and about said bore thereof, said rolling elements in each set being positioned in fixed relation with respect to one another to receive the fuel rod tube end therebetween and align the tube end with the end plug as the tube end is moved through said bore and into engagement with the end plug; and
    (c) retaining means disposed adjacent to said one end of said housing bore for engaging the end plug so as to maintain it in a stationary seated position at said one end of said housing bore.

2. The fuel rod tube end guiding apparatus as recited in claim 1, wherein said retaining means includes:
    means defining a recess in said housing extending generally perpendicular to said one end of said housing bore;
    a retainer pin disposed in said recess and extending therefrom for engagement with the periphery of the end plug when received at said one end of said housing bore; and
    a spring disposed in said recess so as to bias said retainer pin toward said one end of said housing bore.

3. The fuel rod tube end guiding apparatus as recited in claim 1, wherein said one end of said housing bore is of a diameter sized to provide a close fit with the end plug so as to hold the end plug.

4. The fuel rod tube end guiding apparatus as recited in claim 1, wherein said each set of said rolling elements is composed of four rolling elements per set circumferentially spaced about said housing bore approximately ninety degrees apart.

5. The fuel rod tube end guiding apparatus as recited in claim 1, wherein said plurality of sets of rolling elements is composed of three sets axially spaced along said bore.

6. The fuel rod tube end guiding apparatus as recited in claim 1, wherein each said rolling element includes:
    an outer cylindrical race;
    an inner cylindrical race inserted concentrically within and spaced radially inwardly from said outer race; and
    a plurality of metallic balls disposed between said outer and inner races.

7. The fuel rod tube end guiding apparatus as recited in claim 6 wherein each said rolling element is rotatably mounted in said housing by a pin received in a slip fit through said inner race and connected in a press fit with said housing.

8. The fuel rod tube end guiding apparatus as recited in claim 6, wherein said plurality of rolling elements receive the fuel rod tube end therebetween and align the tube end with the end plug by establishing rolling contact between said outer races thereof and the fuel rod tube end.

9. Apparatus for guiding a hollow tubular end of a nuclear fuel rod tube toward an end plug for application of said end plug into said tube end, said apparatus comprising:
    (a) a guide housing having an elongated central longitudinal bore with one end for receiving the end plug and an opposite end for receiving the fuel rod tube end, said one end of said housing bore is of a diameter less than that of said opposite end and sized to provide a close fit with the end plug so as to hold the end plug;
    (b) a plurality of sets of rolling elements disposed in said housing at axially spaced positions along and about said bore thereof, said rolling elements in each set being positioned in fixed relation with respect to one another with their peripheries extending within said bore to establish rolling contact with the fuel rod tube end and align the tube end with the end plug as the tube end is moved through said bore between said rolling elements and into engagement with the end plug; and
    (c) yieldable retaining means disposed adjacent to said one end of said housing bore for engaging the end plug so as to maintain it in a stationary seated position at said one end of said housing bore.

10. The fuel rod tube end guiding apparatus as recited in claim 9, wherein said each set of said rolling elements is composed of four rolling elements per set circumferentially spaced about said housing bore approximately ninety degrees apart.

11. The fuel rod tube end guiding apparatus as recited in claim 9, wherein said plurality of sets of rolling elements is composed of three sets axially spaced along said bore.

* * * * *